(12) United States Patent
Buddenbaum et al.

(10) Patent No.: US 9,282,076 B2
(45) Date of Patent: Mar. 8, 2016

(54) ALIGNING CONTENT AND SOCIAL NETWORK AUDIENCE USING ANALYTICS AND/OR VISUALIZATION

(71) Applicant: International Business Machines Corporation, Armonk, NY (US)

(72) Inventors: Donald E. Buddenbaum, Raleigh, NC (US); Peter F. Haggar, Raleigh, NC (US); Heather M. Kreger, Louisburg, NC (US); Arnaud J. Le Hors, Santa Clara, CA (US); John V. Meegan, Ridgefield, CT (US); Keith A. Wells, Angier, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 13/905,792

(22) Filed: May 30, 2013

(65) Prior Publication Data

US 2014/0359022 A1   Dec. 4, 2014

(51) Int. Cl.
*H04L 12/58* (2006.01)
*G06F 17/24* (2006.01)

(52) U.S. Cl.
CPC .............. *H04L 51/32* (2013.01); *G06F 17/241* (2013.01); *H04L 51/12* (2013.01); *H04L 51/14* (2013.01)

(58) Field of Classification Search
CPC ................... G06F 17/30011; G06F 17/30908; G06F 21/00; G06F 21/552; G06F 17/241; G06Q 30/02; H04L 67/06; H04L 67/10; H04L 51/12; H04L 51/14; H04L 51/32
See application file for complete search history.

(56) References Cited

U.S. PATENT DOCUMENTS

| | | | |
|---|---|---|---|
| 7,523,138 B2 | 4/2009 | Gruhl et al. | |
| 2008/0071873 A1 | 3/2008 | Gross | |
| 2008/0091684 A1* | 4/2008 | Ellis et al. ....................... | 707/10 |
| 2009/0165140 A1* | 6/2009 | Robinson et al. ............... | 726/26 |
| 2010/0268682 A1 | 10/2010 | Lewis et al. | |
| 2012/0005209 A1* | 1/2012 | Rinearson et al. ............. | 707/737 |
| 2012/0042391 A1* | 2/2012 | Risan ............................... | 726/28 |
| 2013/0031601 A1* | 1/2013 | Bott .................................. | 726/1 |
| 2013/0254314 A1* | 9/2013 | Chow ............................ | 709/206 |
| 2013/0254331 A1* | 9/2013 | Yamashita et al. ............. | 709/217 |

FOREIGN PATENT DOCUMENTS

WO      2010094626 A1    8/2010

* cited by examiner

*Primary Examiner* — Le H Luu
(74) *Attorney, Agent, or Firm* — Scully, Scott, Murphy & Presser, P.C.; Dermott Cooke, Esq.

(57) ABSTRACT

Various embodiments provide for the use of analytics to determine a number of key factors prior to a user sending a communication (e.g., an email or instant message, making an online social media post, or accepting or requesting friendship on a social media site). The analytics may determine content, subject, emotion, relationships, and other relevant details when users interact (e.g., with email or other social software). Any alerts/suggestions provided can be provided in real-time as the person types.

20 Claims, 5 Drawing Sheets

ALIGNING CONTENT AND SOCIAL NETWORK AUDIENCE USING ANALYTICS AND/OR VISUALIZATION

BACKGROUND

The present disclosure relates generally to the field of aligning content and social network audience using analytics and/or visualization.

In various examples, aligning content and social network audience using analytics and/or visualization may be implemented in the form of systems, methods and/or algorithms.

Social media posts (e.g., social network site wall posts, micro blogging site posts) and other communications (e.g., instant messaging (IM), email) along with friendship requests and acceptances all typically suffer from a lack of an automated system to scan the communication, to learn information about the communication (e.g., the poster, the intended recipient(s), and the related content) and to alert the poster to relevant information prior to the completion of the intended communication.

SUMMARY

In various embodiments, methodologies may be provided that automatically align content and social network audience using analytics and/or visualization.

In one embodiment, a method for identifying questionable content in a proposed communication from a sender, wherein the proposed communication comprises initial content, is provided, the method comprising: receiving by a processor the initial content; receiving by the processor an identification of at least one proposed recipient; receiving, by the processor, private information associated with the proposed recipient from a source of private information about the proposed recipient; receiving, by the processor, public information associated with the proposed recipient from a source of public information about the proposed recipient; identifying by the processor, based upon the received initial content, the received private information and the received public information, at least a portion of the initial content as the questionable content; and indicating by the processor, to the sender, the identified questionable content.

In another embodiment, a computer readable storage medium, tangibly embodying a program of instructions executable by the computer for identifying questionable content in a proposed communication from a sender, wherein the proposed communication comprises initial content, is provided, the program of instructions, when executing, performing the following steps: receiving the initial content; receiving an identification of at least one proposed recipient; receiving private information associated with the proposed recipient from a source of private information about the proposed recipient; receiving public information associated with the proposed recipient from a source of public information about the proposed recipient; identifying, based upon the received initial content, the received private information and the received public information, at least a portion of the initial content as the questionable content; and indicating, to the sender, the identified questionable content.

In another embodiment, a computer-implemented system for identifying questionable content in a proposed communication from a sender, wherein the proposed communication comprises initial content, is provided, the system comprising: a first receiving element configured to receive the initial content; a second receiving element configured to receive an identification of at least one proposed recipient; a third receiving element configured to receive private information associated with the proposed recipient from a source of private information about the proposed recipient; a fourth receiving element configured to receive public information associated with the proposed recipient from a source of public information about the proposed recipient; an identifying element configured to identify, based upon the received initial content, the received private information and the received public information, at least a portion of the initial content as the questionable content; and an indicating element configured to indicate, to the sender, the identified questionable content.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
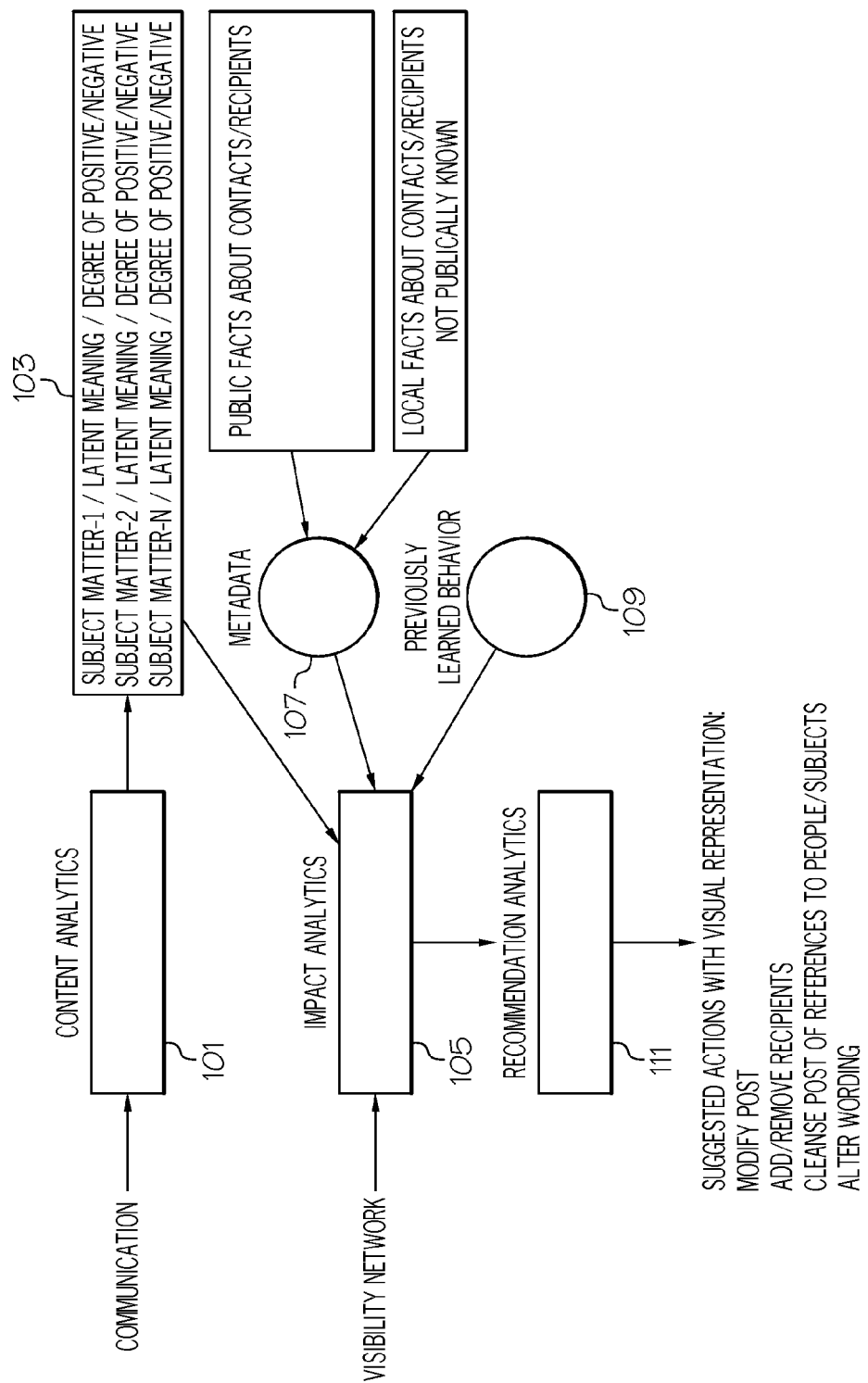
FIG. 1 depicts a block diagram of an implementation according to an embodiment of the present invention.

In one embodiment, aligning content and social network audience (e.g., using analytics and visualization) comprises: analyzing a communication for content considering an audience; and identifying a portion of the content for updating (e.g., changing, filtering, removing) based on the audience.

In another example, the aligning content and social network audience further comprises: extracting (after identifying) the portion of the content which is sensitive (in the context of the audience). In one specific example, such sensitive content is selected from a group including (but not limited to): ideas, subject, emotion, relationship, company, words, and/or social interaction as it pertains to the audience.

In another example, the identifying comprises: presenting the portion of the content which is sensitive by utilizing a visual cue selected from a group including (but not limited to): highlighting, bolding, italicizing; and/or coloring.

In another example, the analyzing further comprises: utilizing learned behavior extracted from a profile.

In another example, the aligning content and social network audience further comprises: suggesting changes to the sender(s) of the communication.

In other specific examples, the following functionality is provided: (a) before a user makes a social media post, the user is informed to whom that post will be visible and if the post likely contains content or opinions that the user would not want shared with the audience; (b) before a user accepts a friendship request, the user is informed if there is any content on the user's social media site that the user likely would not want to be shared with the new friend; and/or (c) before a users accepts an additional person in a group IM chat, the user is informed if there is any content in the chat prior to the new person joining that the user would likely not want to be shared with the new person.

Further, if there is content that the user would not want to share (such as in the examples above), the user may be given an option to change and/or remove this information.

In various additional examples, the following functionality is provided: (a) before a first user finalizes a friendship request, the first user is informed if the other user they are asking to be friends with has content on their wall (and/or belongs to one or more groups) that the first user would likely find inappropriate; and/or (b) when sending a communication (e.g., an email or making a social media post), the sender is informed if they should include other people to receive the communication (e.g., in the email distribution or additional friends or circle of friends for a post).

In various additional examples, embodiments: (a) perform deep analytics on the content, the metadata about the sender, and the metadata about the intended recipient(s); and/or (b) present various options/recommendations to the sender about how and why to alter the content of the post, limit or expand the visibility of the content and/or limit/expand their social network.

For the purposes of describing and claiming the present invention the term "social network" is intended to refer to a grouping of people according to one or more relationships between and/or among them. In one example, a social network may include a plurality of members and may be organized and maintained via a computer system.

For the purposes of describing and claiming the present invention the term "communication" is intended to refer to dissemination of information from one or more people to one more other people. In various examples, such communication may include (but not be limited to): a text message; an email; a post (e.g., a blog post); a repost (e.g., a blog repost); a friend request; an instant message (IM); a forum post, a chat room post, a wiki, a social media post; a file; and/or a document.

For the purposes of describing and claiming the present invention the term "visibility network" is intended to refer to those recipient(s) of a communication who would be able to read or otherwise access the communication in the event that the communication were to be sent.

For the purposes of describing and claiming the present invention the term "questionable content" is intended to refer to content of a communication that would likely be: (a) objectionable (or otherwise upsetting) to a recipient in the context of the communication; and/or (b) inappropriate for a recipient to view in the context of the communication.

For the purposes of describing and claiming the present invention the term "private information" (e.g., as used in the context of private information about a proposed recipient) is intended to refer to information that is not readily obtainable via publically accessible sources. In various examples, such private information may be obtained directly from a person such as via email or instant message.

For the purposes of describing and claiming the present invention the term "public information" (e.g., as used in the context of public information about a proposed recipient) is intended to refer to information that is readily obtainable via publically accessible sources. In various examples, such public information may be obtained from a website.

Various embodiments use analytics to analyze one or more communications to discover the following artifacts: (a) the latent meaning of the communication; (b) the content and various subject matters of the communication; (c) the degree of positive or negative inference on the subject matter; (d) the visibility network associated with the communication; (e) metadata about the intended recipients of the communication (in one example this is collected by looking at public information about the recipients(s) as well as metadata the sender has stored about the sender's contacts); and/or (f) past behavior/content to/from a target audience (in one example, this can be stored in profiles).

In one example, based on the information collected as described above, analytics are further used to determine: (a) if the meaning/content of the communication interferes (or likely interferes) in any way with the known facts about the recipient(s); (b) if there are other contacts that would be interested in the meaning/content of the communication; and/or (c) suggested actions for the sender to avoid a potential problem and/or to widen/expand the visibility network associated with the communication.

Referring now to FIG. 1, a block diagram of an implementation according to an embodiment of the present invention is shown. As seen in this FIG. 1, a communication is input to content analytics 101. Output 103 of the content analytics (e.g., subject matter, latent meaning, degree of positive/negative) is input into impact analytics 105. Also input to impact analytics 105 is the visibility network associated with the communication and various metadata 107 (including, e.g., public facts about the recipients and local facts about recipients that are not publically known. Also input to the impact analytics are previously learned behaviors 109. Further, recommendation analytics 111 receives output from the impact analytics and provides suggested actions with visual representation (see FIG. 2). Various examples of such suggested actions with visual representation include (but are not limited to): modify communication; add/remove recipients(s); clean communication of references to people/subjects; and/or alter wording.

Figure 2:
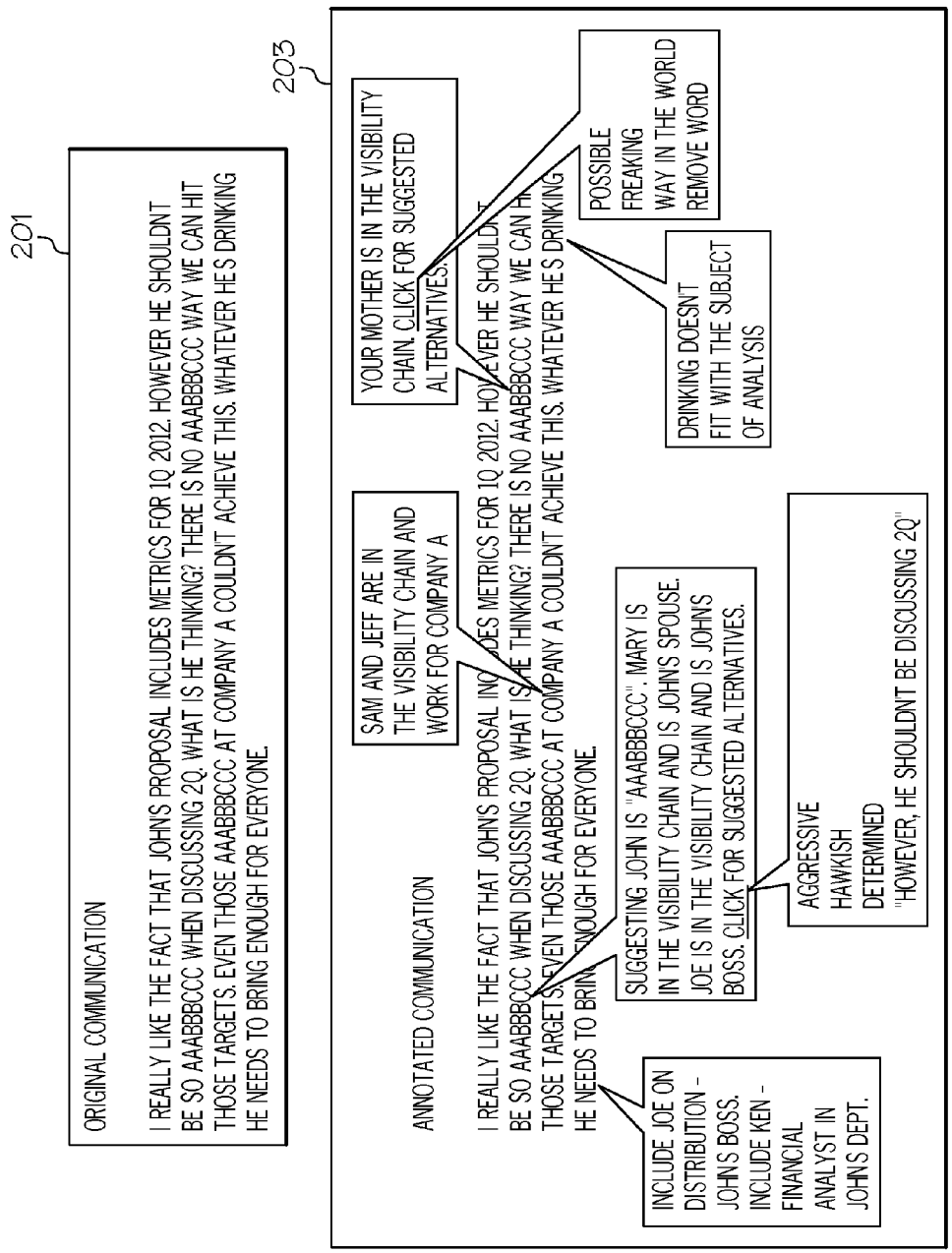
FIG. 2 depicts example user interfaces showing analysis of an initial (or original) content (e.g., email or post) and an annotated version of the initial content according to an embodiment of the present invention.

Referring now to FIG. 2, depicted are example user interfaces showing analysis of an initial (or original) content (e.g., email or post) (see 201) and an annotated version of the initial content (see 203) according to an embodiment of the present invention (as used in this FIG. 2, and throughout the disclosure, the placeholder label "aaabbbccc" is intended to refer to any inappropriate, objectionable or otherwise disparaging word or phrase).

As seen in this FIG. 2, various instances of inappropriate, objectionable or otherwise disparaging words or phrases that occur in the original communication 201 are flagged (that is, indicated visually) in annotated communication 203. Further, annotated communication 203 includes various suggestions for changing the inappropriate, objectionable or otherwise disparaging words or phrases.

Figure 3:
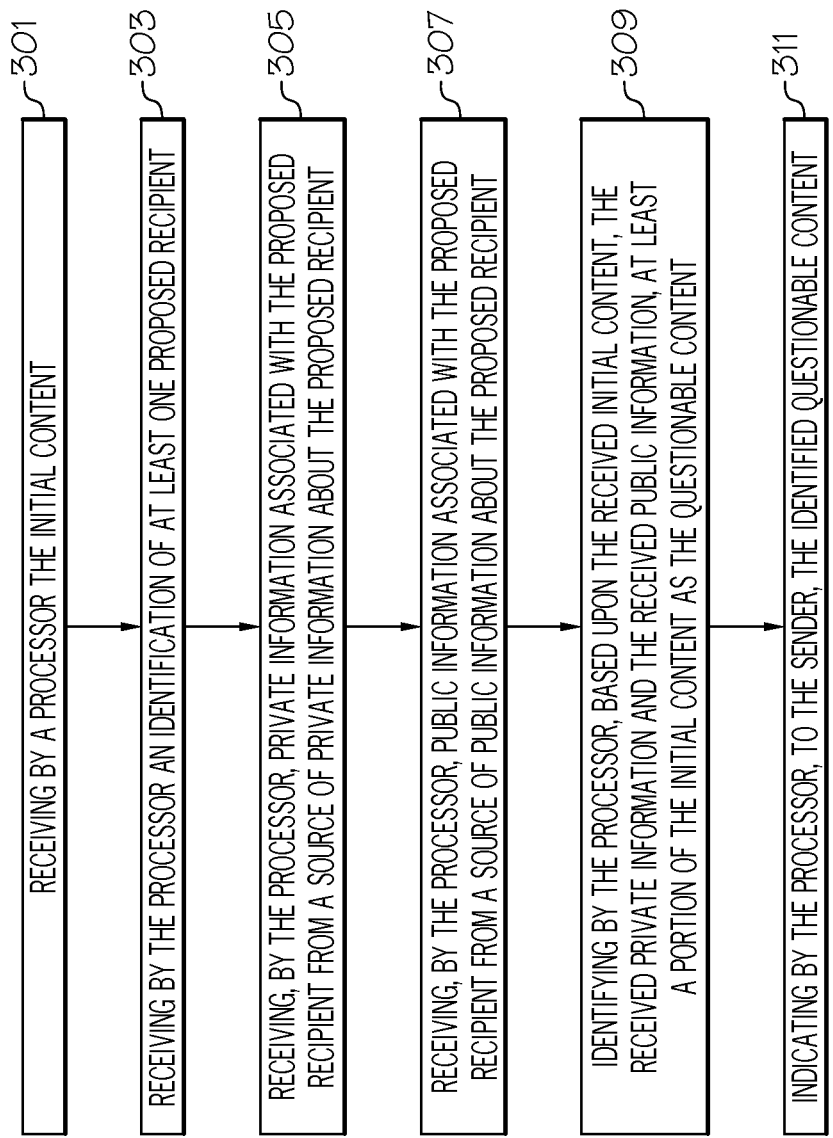
FIG. 3 depicts a flowchart of a method according to an embodiment of the present invention.

Referring now to FIG. 3, a method for identifying questionable content in a proposed communication from a sender, wherein the proposed communication comprises initial content is shown. As seen in this FIG. 3, the method of this embodiment comprises: at 301—receiving by a processor the initial content; at 303—receiving by the processor an identification of at least one proposed recipient; at 305—receiving, by the processor, private information associated with the proposed recipient from a source of private information about the proposed recipient; at 307—receiving, by the processor, public information associated with the proposed recipient from a source of public information about the proposed recipient; at 309—identifying by the processor, based upon the received initial content, the received private information and the received public information, at least a portion of the initial content as the questionable content; and at 311—indicating by the processor, to the sender, the identified questionable content.

In one example, the private information may comprise information (e.g., emails, text messages, etc) that the sender has about the proposed recipient including (but not limited to): interests, prejudices, likes, dislikes.

In another example, the public information may comprise information (e.g., email, micro blogging posts, blog posts, social networking site, web, articles, blogs, books, etc. made by recipients) including (but not limited to): interests, prejudices, likes, dislikes.

In another example, any steps may be carried out in the order recited or the steps may be carried out in another order.

Figure 4:
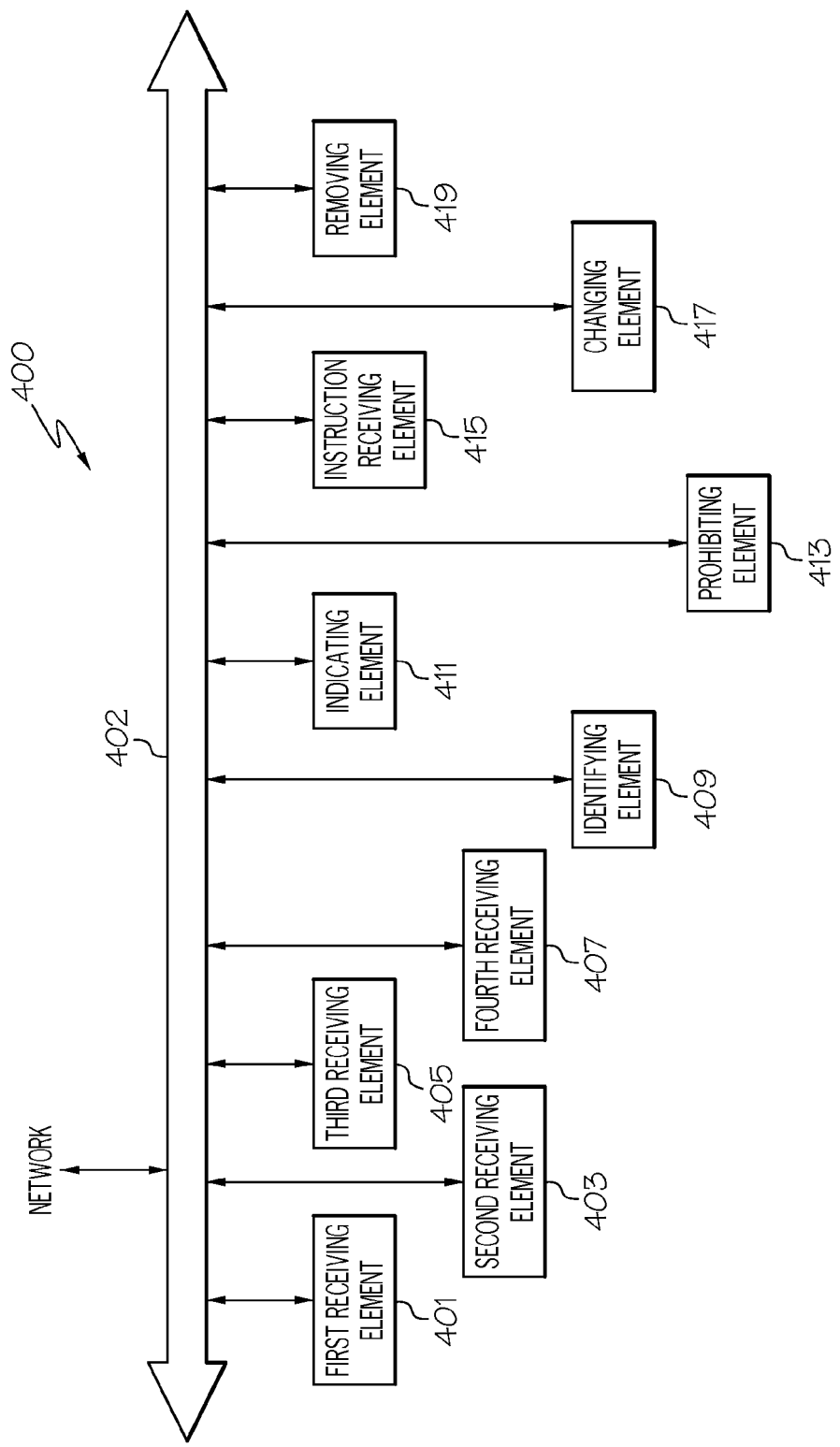
FIG. 4 depicts a block diagram of a system according to an embodiment of the present invention.

Referring now to FIG. 4, in another embodiment, a system 400 for identifying questionable content in a proposed communication from a sender, wherein the proposed communication comprises initial content is provided. This system may include the following elements: a first receiving element 401 configured to receive the initial content; a second receiving element 403 configured to receive an identification of at least one proposed recipient; a third receiving element 405 configured to receive private information associated with the proposed recipient from a source of private information about the proposed recipient; a fourth receiving element 407 configured to receive public information associated with the proposed recipient from a source of public information about the proposed recipient; an identifying element 409 configured to identify, based upon the received initial content, the received private information and the received public information, at least a portion of the initial content as the questionable content; and an indicating element 411 configured to indicate, to the sender, the identified questionable content.

Still referring to FIG. 4, the system 400 may further comprise: a prohibiting element 413 configured to prohibit the sender from completing the proposed communication until after the sender removes and/or changes the identified questionable content that is indicated to the sender; an instruction receiving element 415 configured to receive from the sender an instruction to: (a) remove the identified questionable content that is indicated to the sender; (b) change the identified questionable content that is indicated to the sender; or (c) any combination thereof; a changing element 417 configured to change the identified questionable content; and a removing element 419 configured to remove at least one proposed recipient from a distribution list based upon the identified questionable content.

Still referring to FIG. 4, each of the elements may be operatively connected together via system bus 402. In one example, communication between and among the various elements may be bi-directional. In another example, the communication may be carried out via the Internet, an intranet, a local area network, a wide area network and/or any other desired communication channel(s). In another example, some or all of these elements may be implemented in a computer system of the type shown in FIG. 5.

Figure 5:
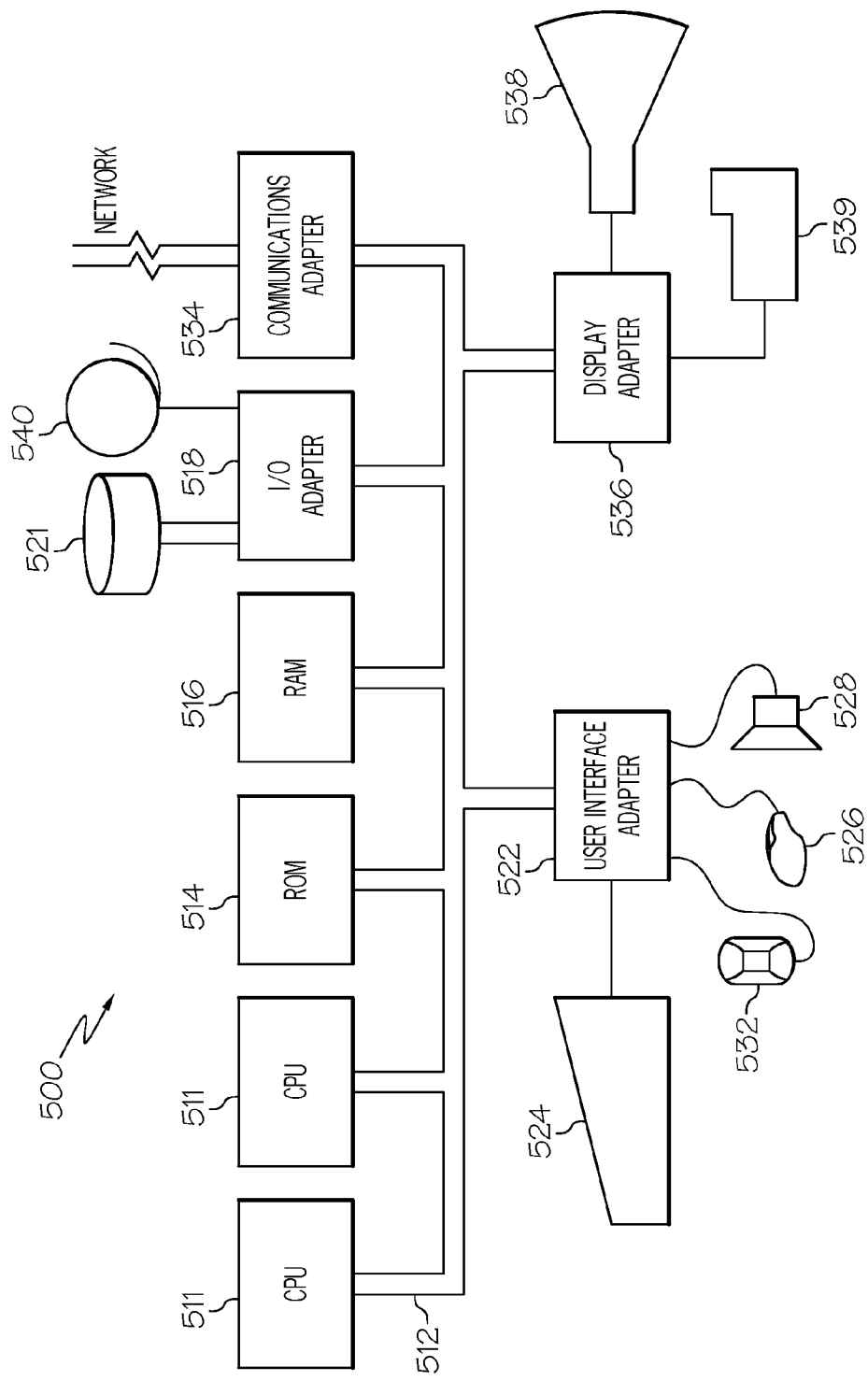
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an intranet, a local area network (LAN), etc., and a display adapter 536 for connecting the bus 512 to a display device 538 and/or printer 539 (e.g., a digital printer or the like).

Of note, while various figures may show various entities communicating, it is to be understood that the figures are actually referring to communication by computer system(s) or the like that are owned, leased, operated, used by, in the possession of, and/or controlled by each of the entities.

As described herein are mechanisms that use analytics to determine a number of key factors prior to a user sending a communication (e.g., an email or instant message, making an online social media post, or accepting or requesting friendship on a social media site). The analytics may determine content, subject, emotion, relationships, and other relevant details when users interact (e.g., with email or other social software). In addition, any previous learned behaviors can be factored in to the analysis and/or stored as profiles. Any alerts/suggestions provided can be provided in real-time as the person types.

Reference will now be made to a number of example implementations. The first of these examples is an instant messaging implementation. In this example, John, Bob, and Sue, who are all managers, are involved in a group chat session and are waiting for Bill (who is a non-manager) to join. Prior to Bill joining, the managers chat about personnel issues and policies. Bill now attempts to join the chat and can scroll up and see what was said prior to him joining. At the time Bill accepts his invitation to the chat, the chat content is analyzed and the current participants are warned that Bill, a non-manager is about to join and there are references to personnel and/or benefits and/or salary discussions in the chat that he can see. The system knows that Bill is a non-manager and that the content may not be appropriate. It then gives the existing participants the option to cleanse the chat (e.g., delete inappropriate content) prior to Bill joining and seeing this information.

The next of these examples is an example of accepting a "friendship request". In this example, John gets a friendship request from Bob. The system will analyze all information that will be visible to Bob once John accepts the friendship request. The system then optionally warns John of any content that may embarrass him or that Bob would find objectionable. For example, a year ago John posted on his social network site wall that he met Bob at a social function and thought he was a aaabbbccc who dressed poorly but drove a cool sports car. Now a year later, John gets a friendship request from Bob as they now are both part of the same sports car club and have since become friendly due to their common interest. John has completely forgotten about this disparaging post. If he accepts Bob's friendship request, this could lead to an embarrassing situation because as John's friend, Bob will have access to John's social network site wall and may see this year-old post. The system alerts John and allows him to cleanse his wall posts (e.g., to selectively remove content related to Bob), then accept Bob's friendship request.

John and Bob are now friends. Bob tells John he is also a member of group X. This fact may not go over well with others, but John adds this fact as metadata about his new friend Bob as it is not part of Bob's metadata that he shares publically. Now, John is typing a post he wants to put on his social network site wall. The system does a real-time scan as John types while scanning Bob's publically available metadata along with the metadata that John has stored about Bob and finds that John's post makes negative remarks about group X, of which Bob is a member. The system warns John of this fact allowing him to edit his post.

The next of these examples is an example of a social media post. In this example, John is about to post to his social network site wall something that contains remarks about Company A. The system analyzes the post and determines a level of positive or negative inference on the subject matter. Is the post mildly positive/negative or is it strongly positive/ negative? A post containing "aaabbbccc Company A", or "Company A's founder is a aaabbbccc" would receive a strongly negative rating versus a post that contained "Company A's founder is a shrewd business man, but I don't always agree with his decisions" which would get a mild negative rating. The system can warm John, for example, that two of his friends who have access to his social network site wall work for Company A. The system can also tell him, for example, that three other of his friends work for Company B and since that Company B is friendly with Company A, they may not look too kindly on his post. In addition, John may have, for example, used profanity in the post and the system warns him that his mother will see the post. The system could then suggest a set of possible actions: 1) Selectively remove the questionable content from the post. 2) Tone down the questionable content. For example, suggest changing "Company A's founder is a aaabbbccc" to "I think Company A's founder has some shortcomings." 3) Make the post less visible by removing those that might find it objectionable (e.g., remove the mother and five friends at Company A and Company B). 4) Suggest to include others (a different "circle of friends"), who work for Company C, and are likely to find the post amusing/informative/non-offensive.

As described herein are embodiments that provide for the automatic assimilation of deep knowledge about a visibility network (that is, potential communication recipient(s)). The knowledge may be obtained from the recipients' profiles, relationships and/or likes/dislikes/prejudices through multiple dynamic mechanisms including private information and public information obtained from a broad set of social media networks. In addition, the use of advanced analytics, applicability to a wide range of social media technologies, and/or real-time alerting may be provided.

As described herein are embodiments that provide for utilizing a deep understanding of the content of a communication in the context of the applicable visibility network in order to, based on this understanding, make targeted suggestions for adding/removing people to/from the visibility network.

In another example, various embodiments provide for the ability to dynamically and in real-time discover aspects of recipients in a visibility network and make various suggestions. The suggestions may relate to (but not be limited to): suggestions regarding inappropriate content; suggestions regarding objectionable content.

In another example, various embodiments provide for the ability to determine inappropriate and/or objectionable content based on the content and what is learned about the recipients, their relationships to the sender, to each other, as well as inferred likes and dislikes. For example, if John works for Company A, he is likely to be offended by negative comments about Company B because Company A and Company B are friendly. Joe would likely not be offended as he works for Company C (which is not friendly with Company A).

In another example, various embodiments provide for the ability to dynamically inspect social networks, online calendars (e.g., with respect to recurring events such as meetings), and/or online content to suggest adding and/or or removing recipients.

In another example, analysis is done in real-time on the machine (that is, computer) of the source user (that is, the sender of the communication).

In another example, one or more profiles (e.g., sender and/or recipient profiles) may be used (but are not required).

In another example, analysis of one or more previous communications (e.g., sender and/or communications) may be made (but are not required).

In another example, predefined rules may be used (but are not required).

In another example, analytics (e.g. "for" or "against" inferences) may be carried out via text analytics.

In another example, analytics/visualization may be carried out in real-time and/or may be adaptive.

In one embodiment, a method for identifying questionable content in a proposed communication from a sender, wherein the proposed communication comprises initial content, is provided, the method comprising: receiving by a processor the initial content; receiving by the processor an identification of at least one proposed recipient; receiving, by the processor, private information associated with the proposed recipient from a source of private information about the proposed recipient; receiving, by the processor, public information associated with the proposed recipient from a source of public information about the proposed recipient; identifying by the processor, based upon the received initial content, the received private information and the received public information, at least a portion of the initial content as the questionable content; and indicating by the processor, to the sender, the identified questionable content.

In one example, the proposed communication comprises: (a) a text message; (b) an email; (c) a post; (d) a repost; (e) a friend request; (f) an instant message; (g) a forum post; (h) a chat room post; (i); a wiki; (j) a file; (k) a document; or (l) any combination thereof.

In another example, the identification of the proposed recipient comprises one of: (a) a single email recipient; (b) an email distribution list; (c) a single instant message recipient; (d) a group instant chat list; (e) a social network distribution list; (f) a social network friends list; or (g) any combination thereof.

In another example, the source of private information comprises one of: (a) one or more emails sent by the proposed recipient; (b) one or more instant messages sent by the proposed recipient; (c) metadata associated with the proposed recipient; or (d) any combination thereof.

In another example: (a) the one or more emails had been sent by the proposed recipient to the sender; (b) the one or more instant messages had been sent by the proposed recipient to the sender; (c) the metadata had been sent by the proposed recipient to the sender.

In another example, the source of public information comprises one of: (a) one or more emails sent by the proposed recipient; (b) one or more micro blogging posts sent by the proposed recipient; (c) one or more articles by the proposed recipient; (d) one or more blogs by the proposed recipient; (e) one or more books by the proposed recipient; (f) one or more social network site wall posts by the proposed recipient; or (d) any combination thereof.

In another example, the identified questionable content is indicated to the sender by visually modifying the initial content.

In another example, the visual modification comprises one of: (a) highlighting; (b) bolding; (c) italicizing; (d) coloring; or (e) any combination thereof.

In another example, the method further comprises: receiving, by the processor, an identification of a plurality of proposed recipients; receiving, by the processor, private information associated with each of said plurality of proposed recipients from a source of private information about each of said plurality of proposed recipients; receiving, by the processor, public information associated with each of said plurality of proposed recipients from a source of public information about each of said plurality of proposed recipients; identifying, by the processor, based upon the received initial content, the received private information about each of said plurality of proposed recipients and the received public information about each of said plurality of proposed recipients, at least a portion of the initial content as the questionable content.

In another example, the method further comprises prohibiting, by the processor, the sender from completing the proposed communication until after the sender removes or changes the identified questionable content that is indicated to the sender.

In another example, the method further comprises receiving by the processor, from the sender, an instruction to: (a) remove the identified questionable content that is indicated to the sender; (b) change the identified questionable content that is indicated to the sender; or (c) any combination thereof.

In another example, the method further comprises removing, by the processor, at least one proposed recipient from a distribution list based upon the identified questionable content.

In another embodiment, a computer readable storage medium, tangibly embodying a program of instructions executable by the computer for identifying questionable content in a proposed communication from a sender, wherein the proposed communication comprises initial content, is provided, the program of instructions, when executing, performing the following steps: receiving the initial content; receiving an identification of at least one proposed recipient; receiving private information associated with the proposed recipient from a source of private information about the proposed recipient; receiving public information associated with the proposed recipient from a source of public information about the proposed recipient; identifying, based upon the received initial content, the received private information and the received public information, at least a portion of the initial content as the questionable content; and indicating, to the sender, the identified questionable content.

In one example, the proposed communication comprises: (a) a text message; (b) an email; (c) a post; (d) a repost; (e) a friend request; (f) an instant message; (g) a forum post; (h) a chat room post; (i); a wiki; (j) a file; (k) a document; or (l) any combination thereof.

In another example, the identified questionable content is indicated to the sender by visually modifying the initial content.

In another example, the visual modification comprises one of: (a) highlighting; (b) bolding; (c) italicizing; (d) coloring; or (e) any combination thereof.

In another embodiment, a computer-implemented system for identifying questionable content in a proposed communication from a sender, wherein the proposed communication comprises initial content, is provided, the system comprising: a first receiving element configured to receive the initial content; a second receiving element configured to receive an identification of at least one proposed recipient; a third receiving element configured to receive private information associated with the proposed recipient from a source of private information about the proposed recipient; a fourth receiving element configured to receive public information associated with the proposed recipient from a source of public information about the proposed recipient; an identifying element configured to identify, based upon the received initial content, the received private information and the received public information, at least a portion of the initial content as the questionable content; and an indicating element configured to indicate, to the sender, the identified questionable content.

In one example, the proposed communication comprises: (a) a text message; (b) an email; (c) a post; (d) a repost; (e) a friend request; (f) an instant message; (g) a forum post; (h) a chat room post; (i); a wiki; (j) a file; (k) a document; or (l) any combination thereof.

In another example, the identified questionable content is indicated to the sender by visually modifying the initial content.

In another example, the visual modification comprises one of: (a) highlighting; (b) bolding; (c) italicizing; (d) coloring; or (e) any combination thereof.

In other examples, any steps described herein may be carried out in any appropriate desired order.

In other examples, various embodiments may be applied in the context of: (a) social computing, collaboration and communications; (b) software: collaborative applications; and/or (c) software: data access, analysis, and delivery.

As described herein, various embodiments provide: (a) a deep understanding of a communication (e.g., social networking, blogging, micro blogging, email, instant message) in the context of an associated visibility network (e.g., email distribution list, instant message (one or group chat), social network site wall (all)); (b) assimilation of deep knowledge about the visibility network (e.g., people's profiles, relationships, likes/dislikes/prejudices—this may be based off of: (i) people's public profiles; (ii) private data (e.g., emails, text messages, etc) that the sender has about people including, e.g., interests, prejudices, likes, dislikes; and/or (iii) public posts (e.g., email, micro blogging posts, articles, blogs, books, etc. made by recipients) including, e.g., interests, prejudices, likes, dislikes; (c) targeted suggestions for cleansing/softening/hardening of subject matter; (d) targeted suggestions (e.g., content was previously OK for given recipient, should be OK now) for adding/removing people to/from the applicable visibility network (e.g., adding people who may have in interest in a communication and/or adding people to expand a sender's social network); and/or (e) real-time alerting as a user types to possible issues the system discovers.

As described herein, in one embodiment: (a) a determination is made (e.g., based upon who would be able to see a communication (such as an email or a social network post)) if one or more potential recipients should not see the communication in its current form (e.g., because the communication may make the potential recipient(s) upset or otherwise uncomfortable); and/or (b) a determination is made (e.g., based on a current selection of who would be able to see a communication (such as an email or a social network post) as to who else should be included in the visibility of the communication (e.g., based on the subject/content of the communication and/or any additional information that can be learned about other(s) and their interests, etc.).

As described herein, various embodiments provide for controlling (e.g., filtering, removing etc.) display of a communication content to a social network user based on characteristics (such as explicitly and/or implicitly determined from public and/or private sources) corresponding to the social network user.

As described herein, various embodiments provide for analyzing content of a communication to detect content that is sensitive (and/or relevant) for recipient(s) of a social network by analyzing recipient data, the past recipient behavior; sender data, and/or the past behavior of the sender.

As described herein, various embodiments provide for identifying sensitive content in a communication and suggesting a change in recipient(s) and/or content.

As described herein, various embodiments provide for identifying sensitive content and suggesting a change by providing a visual cue (e.g., highlighting or bolding).

In another example, a determination of latent meaning, degree of positive/negative, etc. (see e.g., content analytics of FIG. 1) may be performed via Natural Language Processing (NLP). Such NLP may utilize any appropriate known conventional technique.

In another example, information for the suggestions based upon the visibility network and the private/public data (see e.g., impact analytics of FIG. 1) may be obtained as follows. Once the meaning of the communication and the degree of positive negative etc., is known, a determination of the visibility of the communication (who would be able to see it) may be made. Once it is known who would be able to see the communication, a determination may be made as to what is known about such person or people. A comparison may then be made to compare what is known about such person or people with what is in the communication (e.g., the degree of positive or negative, etc.) and an assessment may be made as to whether the communication is "OK" for the person or people who would see it. For example, if using NLP, a determination may be made that the communication is very negative about topic X, and it is determined that Mary would see it. Further, it might be determined that Mary is very positive about topic X as she writes a daily blog about it, belongs to one or more social networking groups that support topic X, etc.

In another example, information for the suggestions may be produced (see e.g., recommendation analytics of FIG. 1) as follows. The recommendations can be made based on the above—e.g., suggest that Mary be removed from the visibility chain, or tone down the negativity on topic X. Or, in another example, assume the negativity is OK as the people who would see the communication don't like topic X. In yet another example, another person who is currently not in the visibility chain may be found and it may be suggested to add such person as such person would find this communication interesting (e.g., because such person is a member of groups that are anti-topic X). Another example would be that a user is posting about baseball, and it could be recommended that the user include his/her friend Tom with whom the user often trades baseball related messages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for identifying questionable content in a proposed communication from a sender, wherein the proposed communication comprises initial content, the method comprising:
   receiving by a processor the initial content;
   receiving by the processor an identification of at least one proposed recipient;
   receiving, by the processor, private information associated with the proposed recipient from a source of private information about the proposed recipient;
   receiving, by the processor, public information associated with the proposed recipient from a source of public information about the proposed recipient;
   identifying by the processor, based upon the received initial content, the received private information and the received public information, at least a portion of the initial content as the questionable content; and
   indicating by the processor, to the sender, the identified questionable content.

2. The method of claim 1, wherein the proposed communication comprises: (a) a text message; (b) an email; (c) a post; (d) a repost; (e) a friend request; (f) an instant message; (g) a forum post; (h) a chat room post; (i) a wiki; (j) a file; (k) a document; or (l) any combination thereof.

3. The method of claim 1, wherein the identification of the proposed recipient comprises one of: (a) a single email recipient; (b) an email distribution list; (c) a single instant message recipient; (d) a group instant chat list; (e) a social network distribution list; (f) a social network friends list; or (g) any combination thereof.

4. The method of claim 1, wherein the source of private information comprises one of: (a) one or more emails sent by the proposed recipient; (b) one or more instant messages sent by the proposed recipient; (c) metadata associated with the proposed recipient; or (d) any combination thereof.

5. The method of claim 4, wherein: (a) the one or more emails had been sent by the proposed recipient to the sender; (b) the one or more instant messages had been sent by the proposed recipient to the sender; (c) the metadata had been sent by the proposed recipient to the sender.

6. The method of claim 1, wherein the source of public information comprises one of: (a) one or more emails sent by the proposed recipient; (b) one or more micro blogging posts sent by the proposed recipient; (c) one or more articles by the proposed recipient; (d) one or more blogs by the proposed recipient; (e) one or more books by the proposed recipient; (f) one or more social network site wall posts by the proposed recipient; or (d) any combination thereof.

7. The method of claim 1, wherein the identified questionable content is indicated to the sender by visually modifying the initial content.

8. The method of claim 7, wherein the visual modification comprises one of: (a) highlighting; (b) bolding; (c) italicizing; (d) coloring; or (e) any combination thereof.

9. The method of claim 1, further comprising:
   receiving, by the processor, an identification of a plurality of proposed recipients;
   receiving, by the processor, private information associated with each of said plurality of proposed recipients from a source of private information about each of said plurality of proposed recipients;
   receiving, by the processor, public information associated with each of said plurality of proposed recipients from a source of public information about each of said plurality of proposed recipients;
   identifying, by the processor, based upon the received initial content, the received private information about each of said plurality of proposed recipients and the received public information about each of said plurality of proposed recipients, at least a portion of the initial content as the questionable content.

10. The method of claim 1, further comprising prohibiting, by the processor, the sender from completing the proposed communication until after the sender removes or changes the identified questionable content that is indicated to the sender.

11. The method of claim 1, further comprising receiving by the processor, from the sender, an instruction to: (a) remove the identified questionable content that is indicated to the sender; (b) change the identified questionable content that is indicated to the sender; or (c) any combination thereof.

12. The method of claim 1, further comprising removing, by the processor, at least one proposed recipient from a distribution list based upon the identified questionable content.

13. A non-transitory computer readable storage medium, tangibly embodying a program of instructions executable by the computer for identifying questionable content in a proposed communication from a sender, wherein the proposed communication comprises initial content, the program of instructions, when executing, performing the following steps:
   receiving the initial content;
   receiving an identification of at least one proposed recipient;

receiving private information associated with the proposed recipient from a source of private information about the proposed recipient;

receiving public information associated with the proposed recipient from a source of public information about the proposed recipient;

identifying, based upon the received initial content, the received private information and the received public information, at least a portion of the initial content as the questionable content; and indicating, to the sender, the identified questionable content.

14. The non-transitory computer readable storage medium of claim 13, wherein the proposed communication comprises: (a) a text message; (b) an email; (c) a post; (d) a repost; (e) a friend request; (f) an instant message; (g) a forum post; (h) a chat room post; (i); a wiki; (j) a file; (k) a document; or (l) any combination thereof.

15. The non-transitory computer readable storage medium of claim 13, wherein the identified questionable content is indicated to the sender by visually modifying the initial content.

16. The non-transitory computer readable storage medium of claim 15, wherein the visual modification comprises one of: (a) highlighting; (b) bolding; (c) italicizing; (d) coloring; or (e) any combination thereof.

17. A computer-implemented system for identifying questionable content in a proposed communication from a sender, wherein the proposed communication comprises initial content, the system comprising:

a first receiving element configured to receive the initial content;

a second receiving element configured to receive an identification of at least one proposed recipient;

a third receiving element configured to receive private information associated with the proposed recipient from a source of private information about the proposed recipient;

a fourth receiving element configured to receive public information associated with the proposed recipient from a source of public information about the proposed recipient;

an identifying element configured to identify, based upon the received initial content, the received private information and the received public information, at least a portion of the initial content as the questionable content; and an indicating element configured to indicate, to the sender, the identified questionable content.

18. The system of claim 17, wherein the proposed communication comprises: (a) a text message; (b) an email; (c) a post; (d) a repost; (e) a friend request; (f) an instant message; (g) a forum post; (h) a chat room post; (i); a wiki; (j) a file; (k) a document; or (l) any combination thereof.

19. The system of claim 17, wherein the identified questionable content is indicated to the sender by visually modifying the initial content.

20. The system of claim 19, wherein the visual modification comprises one of: (a) highlighting; (b) bolding; (c) italicizing; (d) coloring; or (e) any combination thereof.

* * * * *